(12) United States Patent
Emma et al.

(10) Patent No.: US 7,380,047 B2
(45) Date of Patent: May 27, 2008

(54) APPARATUS AND METHOD FOR FILTERING UNUSED SUB-BLOCKS IN CACHE MEMORIES

(75) Inventors: Philip George Emma, Danbury, CT (US); Allan Mark Hartstein, Chappaqua, NY (US); Thomas Roberts Puzak, Ridgefield, CT (US); Moinuddin Khalil Ahmed Qureshi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/955,780

(22) Filed: Sep. 30, 2004

(65) Prior Publication Data

US 2006/0069843 A1  Mar. 30, 2006

(51) Int. Cl.
*G06F 12/00* (2006.01)
(52) U.S. Cl. .................... 711/3; 711/129; 711/133; 711/136; 709/224
(58) Field of Classification Search ............ 711/3
See application file for complete search history.

(56) References Cited

U.S. PATENT DOCUMENTS

| | | | |
|---|---|---|---|
| 4,774,654 A | 9/1988 | Pomerene et al. | |
| 5,317,718 A * | 5/1994 | Jouppi | 711/137 |
| 5,539,894 A | 7/1996 | Webber | |
| 5,577,227 A | 11/1996 | Finnell et al. | |
| 5,822,763 A * | 10/1998 | Baylor et al. | 711/141 |
| 5,900,011 A * | 5/1999 | Saulsbury et al. | 711/119 |
| 6,349,364 B1 * | 2/2002 | Kai et al. | 711/133 |
| 6,427,192 B1 * | 7/2002 | Roberts | 711/133 |
| 6,516,388 B1 | 2/2003 | McCormick, Jr. et al. | |
| 6,535,961 B2 | 3/2003 | Wilkerson et al. | |
| 6,557,080 B1 * | 4/2003 | Burger et al. | 711/137 |
| 6,735,673 B2 | 5/2004 | Kever | |

OTHER PUBLICATIONS

T. Johnson et al., "Run-time Spatial Locality Detection and Optimization", IEEE-Micro, Dec. 1-3, 1997; 9 pages.
Alan Jay Smith, "Cache Memories", Computing Surveys, vol. 14, No. 3, Sep. 1982; pp. 473-530.
A. Gonzales et al., A Data Cache with Multiple Caching Strategies Tuned to Different Types of Locality; Universitat Politecnica de Catalunya, Barcelona Spain, 1995, pp. 338-347.

* cited by examiner

*Primary Examiner*—Donald Sparks
*Assistant Examiner*—Hashem Farrokh
(74) *Attorney, Agent, or Firm*—Keusey, Tutunjian & Bitetto, P.C.; Mark Wardas

(57) ABSTRACT

A memory system and method includes a cache having a filtered portion and an unfiltered portion. The unfiltered portion is divided into block sized components, and the filtered portion is divided into sub-block sized components. Blocks evicted from the unfiltered portion have selected sub-blocks thereof cached in the filtered portion for servicing requests.

29 Claims, 8 Drawing Sheets

202

APPARATUS AND METHOD FOR FILTERING UNUSED SUB-BLOCKS IN CACHE MEMORIES

BACKGROUND OF THE INVENTION

1. Field of the Invention

The present invention relates to data processing and efficient use of cache space systems, and more particularly to systems where each processor has at least one level of cache memory.

2. Description of the Related Art

Caches hierarchies are used in data processing systems to reduce the latency and bandwidth in accessing memory. Caches are effective because of the temporal and spatial locality that exists in the memory reference streams. Caches exploit temporal locality by keeping a local copy of recently accessed data. Caches exploit spatial locality by fetching and storing more data than is required to service a single cache access. This unit of storage stored in the cache is called a block or line. Lines and blocks will be used interchangeably, hereinafter. Typically, a block can be 128 or 256 bytes. Logically, any memory access is either serviced by the first level cache or initiates a transfer of at least one block from the next level in the memory hierarchy to the first level cache.

A block can be divided into one or more equal sized partitions called sub-blocks. The size of each sub-block is at least large enough to satisfy a single cache access. For example, a block of 256 bytes can be divided in 8 sub-blocks each of 32 bytes. When there is low spatial locality, a block includes sub-blocks that are stored in the cache and are never used. These unused sub-blocks consume cache space without contributing to cache hits. This reduces cache efficiency and degrades system performance.

Significant work has been done, both in the industry and in academia, with a focus on using cache space efficiently. Some of the relevant work is described below.

U.S. Pat. No. 6,735,673 to Kever discloses an apparatus and methods for cache line compression. When blocks of data are stored in compressed form, more blocks can fit into the cache. This increases the probability of a cache hit. Cache compression is dependent only on the values stored in the block and not on the spatial locality of the block. This implies that a compressed block still contains data for unused sub-blocks.

U.S. Pat. No. 6,516,388 to McCormick et al. describes a method and apparatus for reducing cache pollution. Prefetched blocks do not update the least recently used (LRU) stack on installation. This reduces pollution caused by unused prefetched blocks.

U.S. Pat. No. 5,577,227 to Finell et al. discloses a method to decrease the number of stall cycles resulting from a cache miss in a multilevel cache system. On a cache miss, the requested block is fetched. If there are any invalid blocks in the cache as a result of consistency protocol, additional blocks are prefetched along with the requested block.

U.S. Pat. No. 4,774,654 to Pomerene et al., U.S. Pat. No. 6,535,961 to Kumar et al, and U.S. Pat. No. 6,557,080 to Burger et al., disclose a method to prefetch sub-blocks from low speed memory to high speed memory depending upon the state of sub-block reference bits or the outcome of a spatial footprint predictor.

U.S. Pat. No. 5,539,894 to Webber describes a mechanism for optimizing the tag storage identifier used in a computer system. Upon initial power-on of the computer system, the amount of system memory is determined and a minimum number of sub-blocks for the cache memory is selected such that when maximum system memory is installed, fewer sub-blocks are selected for the cache memory.

Splitting a cache based on reference locality is described in an article by Gonzalez et al. titled "A data cache with multiple caching strategies tuned to different types of locality" published in the International Conference on Supercomputing, 1995. Their design consists of a spatial cache, a temporal cache, and a predictor history table. Depending on the prediction history table, the fetched block is either placed in the spatial cache or the temporal cache. This scheme is targeted toward numerical codes that have very predictable spatial locality characteristics.

Johnson et al. in "Spatial Locality Detection and Optimization", published in IEEE-Micro 1997, describe a method to predict spatial locality of the incoming block. Their design consisted of a table called Memory Address Table (MAT) to track spatial locality. MAT controls the number of blocks fetched in case of a cache miss. This scheme requires that the cache be organized using a very small block size and a separate spatial locality prediction structure be accessed before the incoming block is fetched from memory.

Choosing the line size for a cache is one of the fundamental decisions a designer makes in the design of a cache. Large cache line sizes can prefetch nearby data and avoid misses that a smaller line must incur. However, not all of the data in a large line gets referenced by the processor and cache pollution will result. Workload analysis has shown that many database applications use less than 50% of a 256 byte line when brought into the cache. Additionally, large lines require more bus cycles to transfer a line into the cache than a smaller line. This can result in bus queueing during periods of high miss rates.

Thus, it is desirable to design a cache that can have the advantages of both a large line (to prefetch nearby misses) and, when appropriate, a small line that can be transfer quickly and avoid cache pollution by only keeping the referenced information in the cache. By allowing the cache to include a high percentage of useful information (less pollution) misses are avoided and performance is increased.

SUMMARY OF THE INVENTION

In the present invention, a mechanism to filter unused sub-blocks in a cache without the need for accessing any prediction structure for the incoming block is provided. The mechanism may be based on the observation that useful sub-blocks in a block are referenced within a short period of time. In most cases, all used sub-blocks are referenced while the line is in the most-recently-used (MRU) position of the cache. The sub-blocks that are not referenced during this time interval tend to remain unused. This observation leads to a design that tracks the usage of sub-blocks in a block for a certain time interval and evicts sub-blocks that are not used.

According to one embodiment of the present invention, a cache is described that is divided into two parts: an unfiltered portion and a filtered portion. In the unfiltered-cache, an entire block (line of memory) is fetched into the cache whenever a miss occurs. By fetching the entire block, the cache captures the spatial referencing patterns of an application, thus avoiding misses by prefetching nearby accesses.

While a block resides in the unfiltered cache, the sub-blocks referenced by the application are recorded. As each block ages out of the unfiltered-cache, (by nature of the replacement algorithm, typically least recently used (LRU)) the used sub-blocks are copied into the filtered cache. In the filtered-cache, the granularity of data stored is a sub-block. Note that the only information copied into the filtered cache may be the sub-blocks referenced from the entire block. This permits all unused (un-referenced) sub-blocks to be discarded and thus avoids (reduces) cache pollution in the filtered cache.

Since the granularity of information stored in the filtered cache is a sub-block, the filtered cache may include many more unique lines than the unfiltered cache for an equal amount of cache area.

Whenever a cache access occurs, both parts of the cache are accessed simultaneously. Each cache request can be satisfied from either the unfiltered cache or the filtered cache. However, each block or sub-block of memory may only exist in one of the caches at a time. That is, the block or sub-block is either in the filtered cache or unfiltered cache, but not in both. Procedures to insure the exclusivity of a block or sub-block residing in the filtered or unfiltered cache will be described below.

Caches designed with this technique may obtain a miss ratio approximately equal to a cache that is twice as big using a single line-size. For example, a 64K cache including a 32K unfiltered cache and 32K filtered cache (using a 256 Bytes block and a 32-byte sub-block) can have approximately the same miss ratio as a 128K cache with a single 256 bytes line-size.

The present invention reduces the number of misses by reducing the number of unused sub-blocks in cache. The cache may be split into two parts: an unfiltered-cache and a filtered-cache. The granularity of data fetched into the unfiltered-cache (for a miss) is a block and the unit of line stored in the filtered-part is a sub-block. On a cache miss, the incoming block is installed in unfiltered cache. The block resides in the unfiltered cache until it is evicted to create space for some other incoming block. The referenced sub-blocks of this block are then transferred to the filtered-cache and the unused sub-blocks are discarded.

In this manner, the unused sub-blocks are limited to the unfiltered cache and the filtered-cache includes used sub-blocks. The number of sub-block transferred can be dynamically calculated based on the average number of sub-blocks referenced for an application. Filtering of unused sub-blocks results in better utilization of cache space and increases cache hit ratio.

A memory system and method includes a cache having a filtered portion and an unfiltered portion. The unfiltered portion is divided into block sized components, and the filtered portion is divided into sub-block sized components. Blocks evicted from the unfiltered portion have selected sub-blocks thereof cached in the filtered portion for servicing requests.

A hierarchical cache memory system includes a first level cache comprising a filtered portion and an unfiltered portion. The unfiltered portion is divided into block sized components and includes a usage bit to indicate that selected blocks evicted from the unfiltered portion have been previously used. The filtered portion is divided into sub-block sized components such that blocks evicted from the unfiltered portion have selected sub-blocks thereof cached in the filtered portion for servicing requests. A second level cache includes a directory for storing a usage pattern based upon usage bits such that if a miss occurs in the level one cache, blocks indicated as used by the usage bits are provided to the level one cache.

A program storage device readable by machine, tangibly embodying a program of instructions executable by the machine to perform method steps for caching information, the method steps comprising: dividing a cache into a filtered portion and an unfiltered portion, the unfiltered portion storing block sized components, each block comprising a plurality of sub-blocks and the filtered portion storing sub-block sized components; evicting a block from the unfiltered portion in accordance with a policy such that blocks evicted from the unfiltered portion have selected used sub-blocks thereof cached in the filtered portion; and maintaining the selected used sub-blocks in the filtered portion in accordance with the policy.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Cache memories exploit spatial locality by fetching and storing more data than is needed for satisfying a single cache access. This unit of storage is called a block. When there is low spatial locality, a block includes sub-blocks that are never accessed. These unused sub-blocks consume cache space without contributing to cache hits.

The present invention provides a mechanism that filters out unused sub-blocks by splitting the cache space into two parts. The first part (unfiltered cache) is organized to hold blocks, while the second part (filtered cache) holds sub-blocks. Both caches are accessed simultaneously and a cache request can be satisfied from either part.

On a cache miss, an incoming block is installed in the unfiltered cache. The block resides in the unfiltered cache until a replacement engine evicts the block from the cache. The used sub-blocks of this block are then transferred to the filtered-cache and the unused sub-blocks are discarded. Several algorithms may be set forth that statically or dynamically calculate the number of sub-blocks to transfer. In this manner, unused sub-blocks are limited to the unfiltered cache and only used sub-blocks get stored in the filtered-part. Filtering of unused sub-blocks results in better utilization of cache space.

It should be understood that the elements shown in the FIGS. may be implemented in various forms of hardware, software or combinations thereof. Preferably, these elements are implemented in a combination of hardware or software on one or more appropriately programmed general-purpose digital computers having a processor and memory and input/output interfaces.

Figure 1:
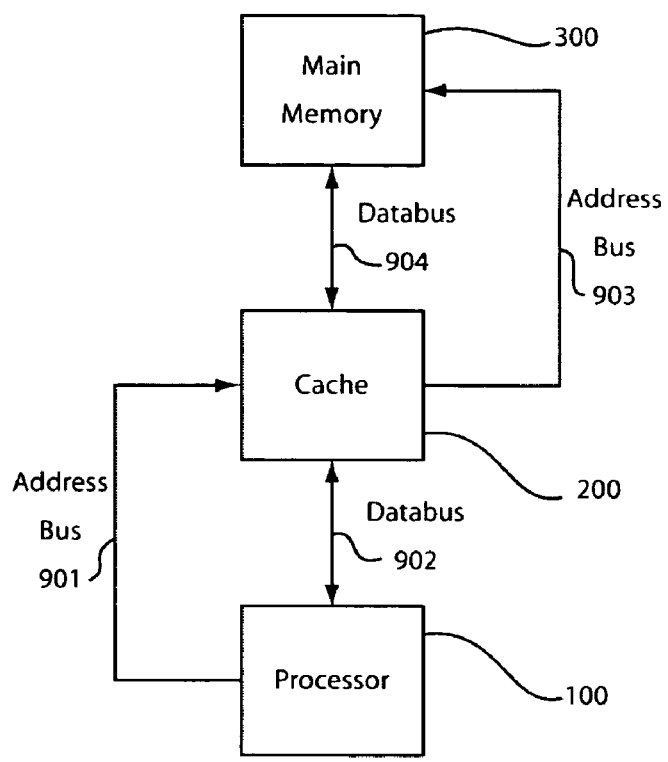
FIG. 1 is an example of a data processing system including a processor, a cache and main memory, which may be implemented in accordance with the present invention.

Referring now to the drawings in which like numerals represent the same or similar elements and initially to FIG. 1, a data processing system 10 includes a processor 100, a cache 200, and main memory 300. For simplicity of explanation, FIG. 1 considers a single cache 200 between the processor 100 and main memory 300. However, in general, a data processing system 10 may include more than one level of cache and separate caches for instructions and data. The present invention may be extended to all caches in the cache hierarchy and to separate instruction and data caches as well.

A more detailed description of the structure of the cache 200 may be found in A. J. Smith "Cache Memories", Computing Surveys, Vol. 14, no. 3, September 1982, pp. 473-530, herein incorporated by reference in its entirety.

All memory requests generated by the processor are searched in the cache memory 200 via address bus 901. If there is a cache hit, data is transferred between the processor 100 and cache 200 via data bus 902. If there is cache miss, the address is sent to the main memory 300 via address bus 903 and block of information including the miss address is transferred from the main memory 300 to the cache 200 via data bus 904.

Figure 2:
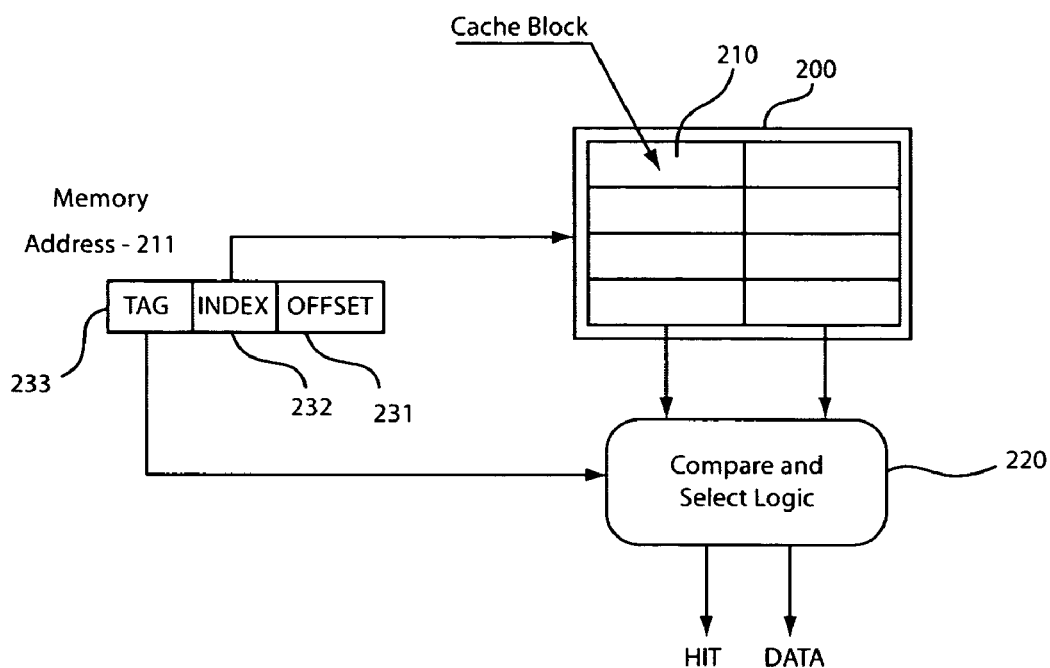
FIG. 2 shows a cache memory in accordance with the prior art.

Referring to FIG. 2 with continued reference to FIG. 1, a cache memory structure 202 is illustratively shown. Cache memory 200 may be organized in units of blocks 210. A memory address 211 coming into cache 200 via address bus 901 is divided into three parts: offset-bits 231 indicating the address of the requested byte in the block, index-bits 232 for hashing into a row of the cache 200, and TAG-bits 233 identifying the block 210 in memory 300.

The cache is indexed according to the value of the index bits 232 from the memory address 211. The TAG information 233, saved in the cache directory of the indexed row, is compared with the TAG bits from the memory address in a compare and select logic module 220. If there is a match, cache compare-and-select logic 220 signals a hit, and data is transferred between the processor 100 and memory 300. If there is no TAG match (a miss), there is a transfer of at least one block of information from the main memory 300 to the cache memory 200.

In general, memory needed to satisfy a single memory reference generated by the processor 100 is much smaller than a cache block 210. However, organizing the cache 200 at the granularity of a block 210 has the advantage of reducing the directory size, and good prefetching potential when the incoming block has high spatial locality. The prefetching potential is explained by example with reference to FIG. 3 below.

Figure 3:
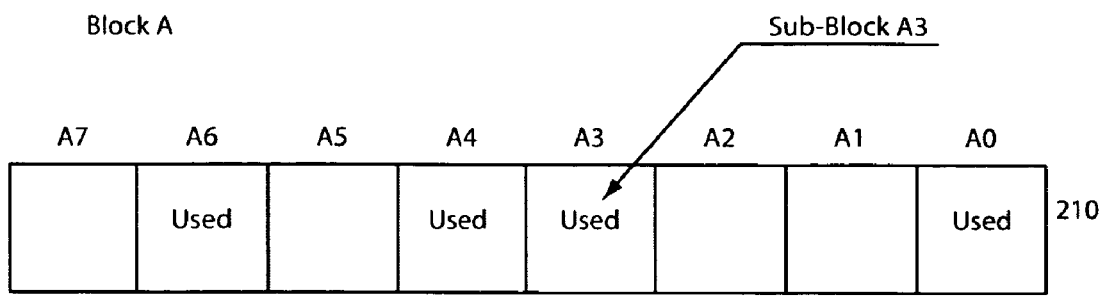
FIG. 3 illustratively shows a cache block divided into eight equal sub-blocks in accordance with one exemplary aspect of the present invention.

Referring to FIG. 3, an illustrative example considers block A (a 256 byte line) divided into eight (32 bytes) sub-blocks, A0 through A7. The size of each sub-block is at least large enough to satisfy a single fetch made by the processor 100 (FIG. 1). In current practice, the unit of block fetched by the process is typically a double word (8 bytes) but larger quantities are possible (16 or 32 bytes). While block A is in the cache, sub-blocks A6, A4, A3 and A0 are used. Thus, by organizing the cache in terms of blocks, block A was able to avoid three cache misses (if a small line size was used) because of spatial locality.

However, a large line size can limit the number of unique blocks saved in the cache for a constant cache size. For example, a 64K cache with a 256 bytes block has 256 unique lines while that same size cache with a 64 bytes block as 1024 lines. Also, if there is low spatial locality for a large line, some of the sub-blocks remain unused. In case of FIG. 3, sub-blocks A7, A5, A2, and A1 are not used. Unused sub-blocks consume cache space without contributing to cache hits. This reduces cache efficiency.

Advantageously, the present invention filters these unused sub-blocks so that cache space can be used for caching only used sub-blocks while still preserving the prefetching benefits of fetching a large initial block of memory for each cache miss.

The structure and operations of the filtered and unfiltered-cache will now be described in greater detail. It should be noted that there are many designs, which may be, implemented which may benefit from the present invention. The mechanism presented here is chosen for simplicity of explanation rather than optimality of design. For example, to simplify the explanation, the available cache space is divided equally between the unfiltered-cache and the filtered-cache. However, for an actual implementation it may be desirable for an unbalanced partitioning of cache sizes. Also, it is assumed that each cache access is sent to both parts and each part has the same access latency. Other variations and options are also contemplated.

Figure 4:
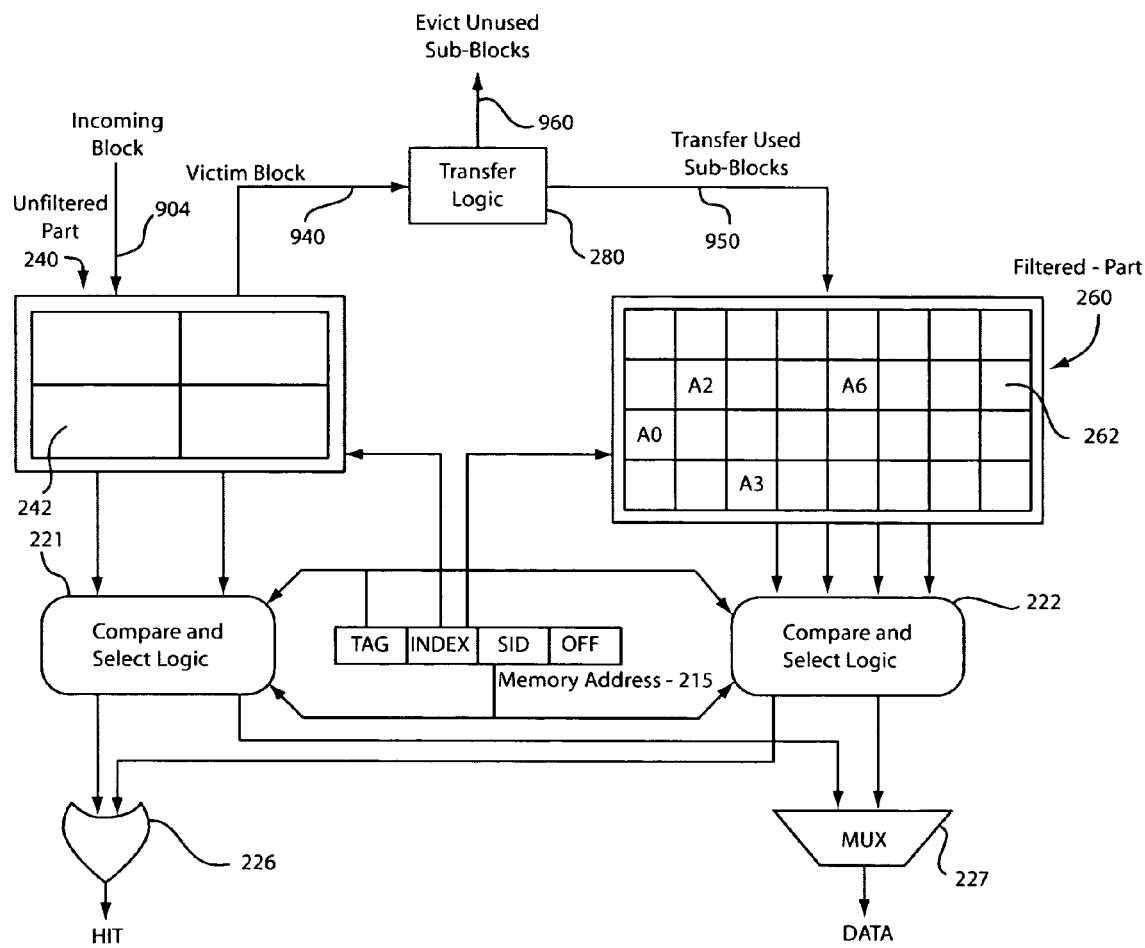
FIG. 4 illustratively shows a cache split into an unfiltered-cache and filtered-cache in accordance with one embodiment of the present invention.

Referring to FIG. 4, a cache system is illustratively depicted in accordance with one embodiment of the present invention. Available cache space is divided into two parts: unfiltered-cache 240 and filtered-cache 260. The unfiltered cache, in this example, includes four blocks 242, divided into two rows, each with two entries. For simplicity, let each block be 256 bytes for this example. Other sized blocks are also contemplated.

The filtered-cache 260 includes four rows, with each row containing 8 sub-blocks 262, in this example. Let each sub-block be 32 bytes. Other sized sub-blocks are also contemplated. Thus, there are 8 sub-blocks in every cache line. Each cache access made by the processor 100 (FIG. 1)(memory address 215) is sent simultaneously to both cache (unfiltered 240 and filtered 260). The memory address 215 may include a tag (TAG), index (INDEX), Sub-block identifier (SID), and Offset (OFF).

The TAG field identifies the block or sub-block saved in the unfiltered-cache 240 or filtered-cache 260. The INDEX field identifies the row that is searched in the unfiltered-cache 240 or filtered-cache 260 to determine if the cache request is in the cache. The sub-block identifier SID determines the sub-block within the block (identified by the TAG field). The Offset field OFF identifies the byte within the block or sub-block requested by the processor.

The TAG and INDEX fields can have different sizes depending on the structure of the unfiltered 240 and filtered-caches 260. For example, in the example shown in FIG. 4, only one bit is needed to identify the row accessed in the unfiltered-cache (since there are only two rows) and two bits are needed to identify the row in the filtered-cache (having 4 rows). Similarly, the TAG, SID, and OFF fields can be of different lengths and use different bits from the memory access address 215 depending on the organization of the unfiltered and filtered caches (e.g., block size, sub-block size, rows and associative sets used in each cache).

The unfiltered-cache 240 is organized in units of blocks 242.

Figure 5:
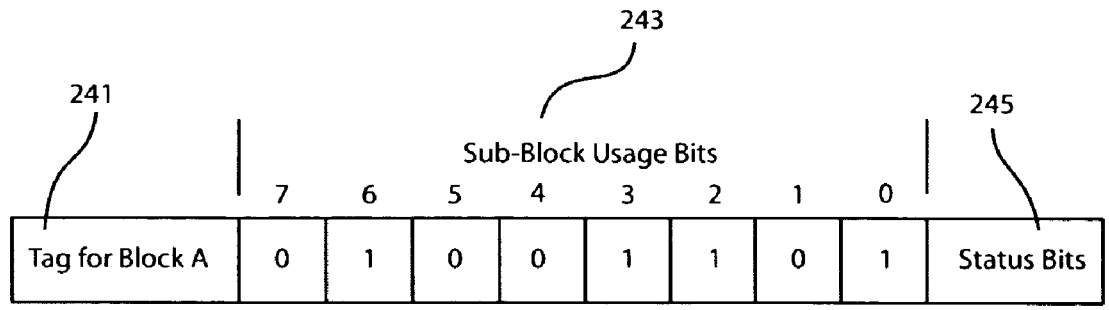
FIG. 5 shows an illustrative directory entry for the unfiltered-cache in accordance with one aspect of the present invention.

Referring to FIG. 5, a directory entry for a block 242 in the unfiltered-cache 240 is illustratively shown. The directory entry, in addition to the TAG 241 and Status 245 (e.g., valid bits, replacement bits) information, also includes sub-block usage bits 243. When a sub-block is used, the corresponding sub-block usage bit is marked as 1; otherwise it remains 0.

When the block is initially installed in the cache (due to a miss) only one sub-block usage bit is set to one (the sub-block within the line referenced by the processor) the rest are initially set to 0. The directory entry shown in FIG. 5 corresponds to the block 210 shown in FIG. 3. The sub-block usage bits for the used sub-blocks of block A from FIG. 3, are A6, A3, A2, and A0 and are marked 1. Other sub-block usage bits are marked 0, indicating they are unused.

The filtered-cache 260 is organized in units of sub-blocks 262.

Figure 6:
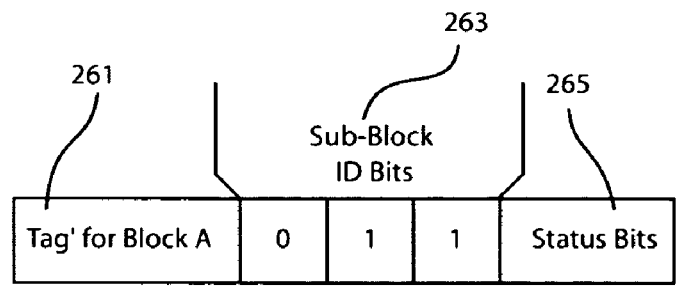
FIG. 6 shows an illustrative directory entry for the filtered-cache in accordance with one aspect of the present invention.

Referring to FIG. 6, a directory entry for a sub-block 262 in the filtered-cache 260 is illustratively shown. The directory entry, in addition to the TAG 261 and status 265 information, also includes bits for identifying the sub-block 263 in the original block. The directory entry shown in FIG. 6 corresponds to sub-block A3 from FIG. 3. The sub-block identifying bits are set to 011. Sub-blocks for the same block from the unfiltered-cache 240 can map to noncontiguous sub-blocks and possibly to different rows in the filtered-cache 260. FIG. 4 shows sub-blocks A6, A3, A2, and A0 of FIG. 3 mapped to different rows of the filtered-cache 260.

The operation of the filtered and unfiltered cache will now be explained. As shown in FIG. 2, index bits are identified from the memory address. Since the unfiltered-cache and filtered-cache have different numbers of rows, the number of index bits selected will be different to access the unfiltered and filtered caches. Both the unfiltered-cache and filtered-cache are indexed simultaneously.

Referring again to FIG. 4, the index field from the memory address (215) selects the row in the unfiltered-cache (240) directory to determine if the request is in the cache. The TAG field in the directory is then compared to the TAG field of the memory address 215 using compare and select logic 221. If there is a match, the cache signals a hit (HIT) and supplies the requested sub-block, identified by the SID field in the memory address to the processor (100, FIG. 1). Here the unit of data transferred to the processor is a sub-block. Smaller units of data can be supplied during a hit using the offset bit from the memory address. For example, the low order three bits from the offset field can be used to select the double work (8 bytes) requested by the processor. The corresponding sub-block usage bit is then set to 1 indicating the sub-block was referenced.

Similarly, the index bits from the memory address (215) are extracted to identify the row in the filtered-cache 260 to determine if the request is in the cache. Compare and select logic 222 compares the TAG and SID information of all the sub-blocks in the selected row of the filtered-cache 260 with the TAG and SID fields of memory address 215. If there is a match, the cache signals a hit (HIT) and supplies the requested sub-block (DATA).

Note, for any access, the block or sub-block can only reside in either the unfiltered-cache 240 or filtered-cache 260, but not in both simultaneously. Either compare and select logic 221 or 222 can signal a hit. The hit is signaled through OR logic 226 and the requested data (DATA) (from the hit (HIT)) is sent to the processor through a multiplexer (MUX) 227.

If there is a miss in both the unfiltered-cache 240 and the filtered-cache 260, the requested block is transferred from the memory (300, FIG. 1) to the unfiltered-cache 904 via data bus 904. It is possible that some sub-blocks of the requested block are present in the filtered-cache 260. In such cases, to avoid duplication, all the sub-blocks of the requested block are invalidated before the block is installed. This insures that the block or sub-block is exclusively in either the filtered or unfiltered cache.

The incoming block is then installed in the unfiltered-cache 240. The replacement algorithm used by the unfiltered cache 240 will choose the block to evict. A least-recently-used (LRU) replacement policy may be employed to choose a block to discard. The block chosen (VICTIM BLOCK) for replacement is sent to transfer logic 280 via bus 940. Here, the transfer logic 280 examines the sub-block usage bits in the directory to determine which sub-blocks were referenced while it resided in the unfiltered-cache 240.

If the sub-block usage bit is 1, then transfer logic 280 transfers the used sub-block of the block just replaced to the filtered-cache 260 via path 950. If the sub-block usage bit is 0 then the unused sub-block is discarded. In this manner, the impact of unused sub-blocks is limited to the unfiltered-cache 240. Only used sub-blocks are stored in the filtered-cache 260. This results in better utilization of cache space.

The embodiment of FIG. 4 may be improved by refining the transfer logic 280. Note that the filtered-cache 260 includes only used sub-blocks. If the victim block evicted from the unfiltered-cache 240 has a high percentage of used sub-blocks (say 7 out of 8) then installing them in the filtered-cache can potentially replace many sub-blocks belonging to more than one block. This can result in more than one miss at the expense of caching sub-blocks from a single block. In such cases, it is beneficial not to cache any of the sub-blocks of the evicted block. Based on this, a static-threshold filtering is provided.

Figure 7:
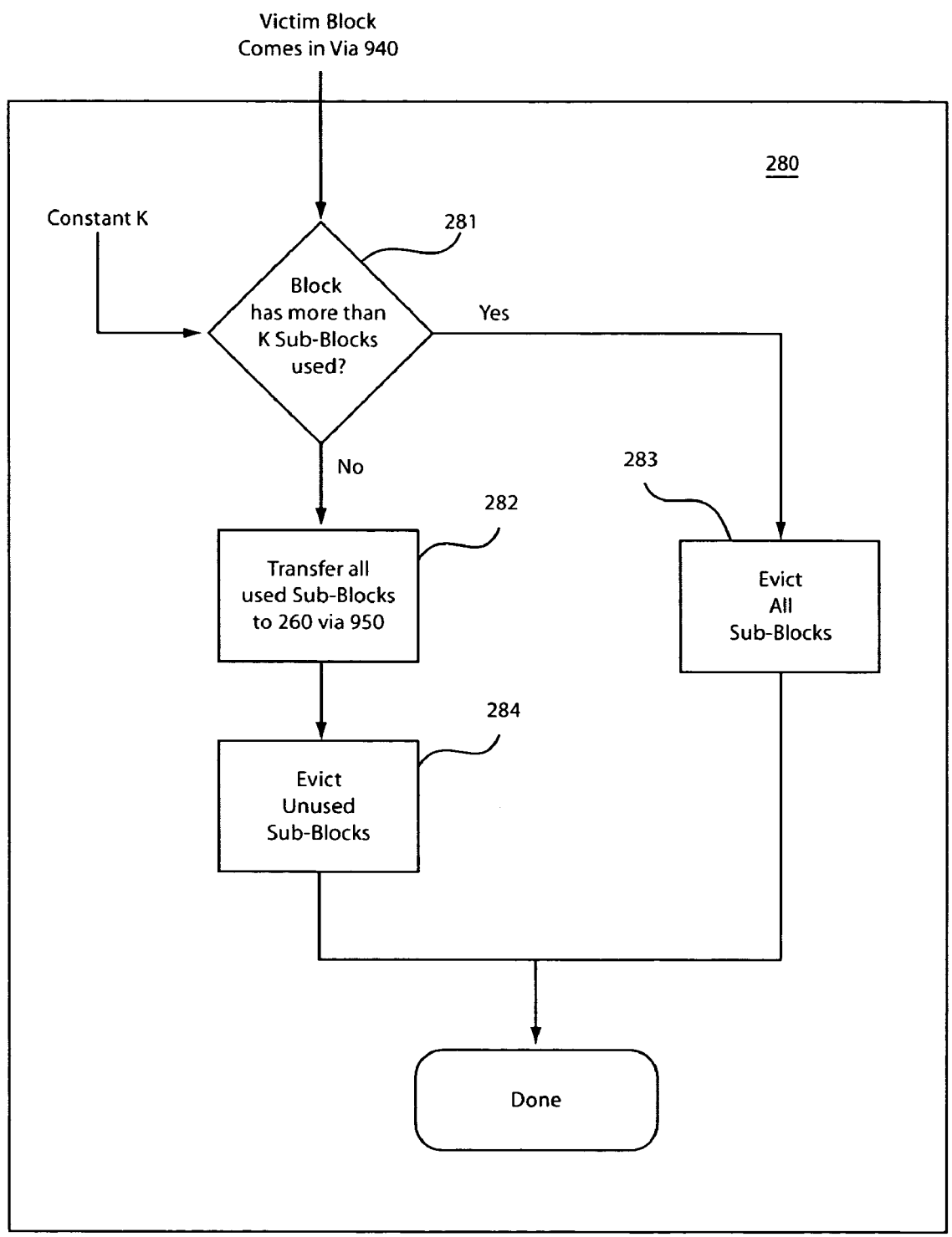
FIG. 7 shows a system/method for evicting sub-blocks with transfer logic having static-threshold filtering in accordance with one embodiment of the present invention.

Referring to FIG. 7, static-threshold filtering may include an input parameter, e.g., a threshold value K, where K is a positive integer less than the number of sub-blocks in a block, say, e.g., 2. When a miss occurs (to both caches) a block having the missed data is brought into the unfiltered-cache via bus 904 (FIG. 4). The replacement algorithm chooses a block to discard to make room for the incoming block.

If the discarded block from the unfiltered-cache has more than K used sub-blocks in step 281, then all the sub-blocks (used and unused) are discarded in step 283. Otherwise, the used sub-blocks are transferred to filtered-cache 260 via bus 950 as described above in step 282. This results in better utilization of the filtered-cache 260 as it can store sub-blocks from more unique blocks. Unused sub-blocks are evicted in step 284.

The above filtering method may further be improved by adapting the value of K based on the dynamic measure of the spatial locality of memory references. This filtering may be referred to as adaptive-threshold filtering. Adaptive-threshold filtering is able to better respond to varying spatial locality characteristics across different workloads and to different phases of the same workload.

Figure 8:
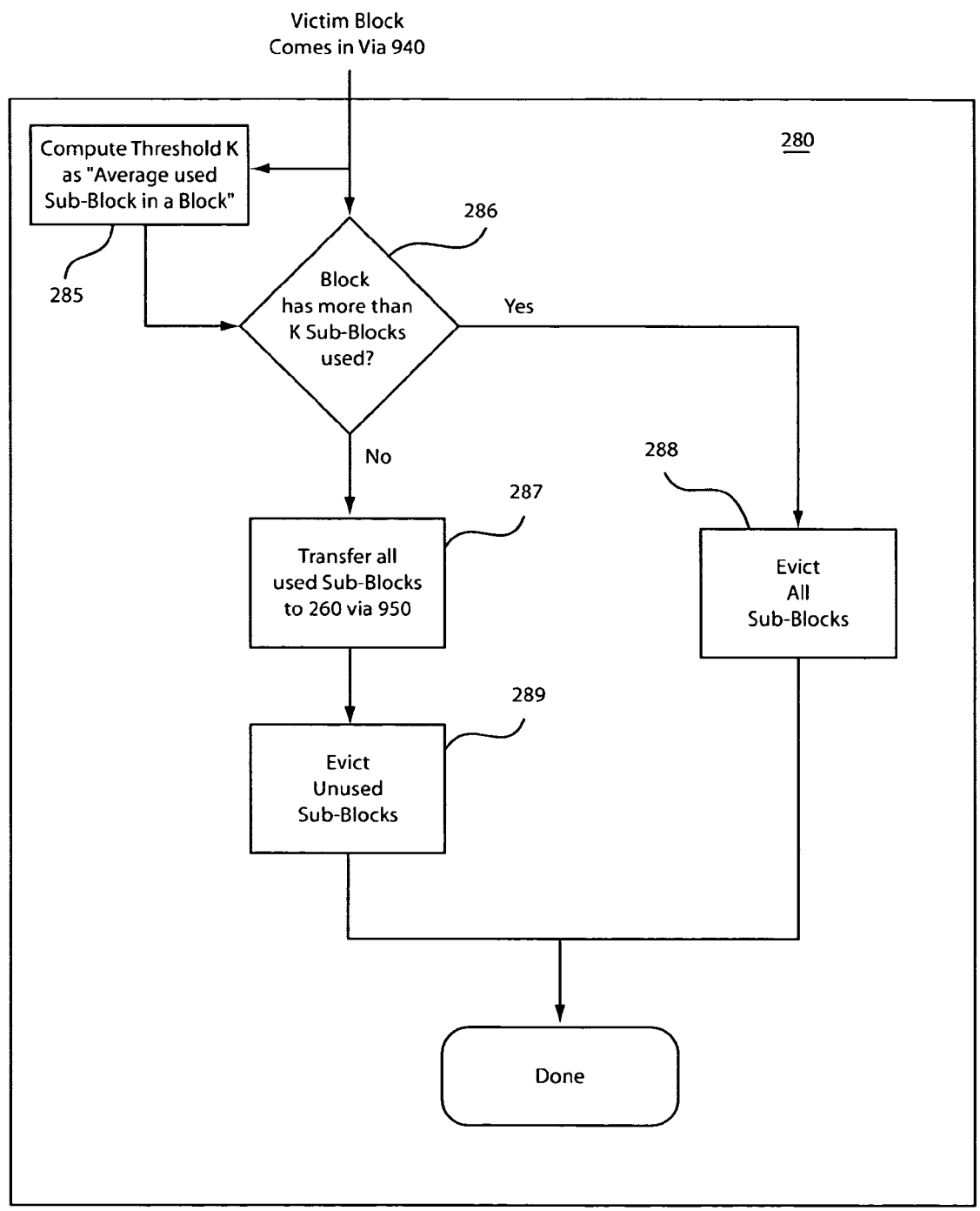
FIG. 8 shows a system/method for evicting sub-blocks with transfer logic having adaptive-threshold filtering in accordance with one embodiment of the present invention.

Referring to FIG. 8, another method for transfer logic 280 with adaptive-threshold filtering is illustratively shown. An evicted block initiates computation of the threshold K in step

285. In one example, K may be computed as the "average number of used sub-blocks in a block" over a predetermined amount of time or number of misses. In step 286, it is determined whether the victim-block has more than K sub-blocks used. If yes, then all the sub-blocks are evicted in step 288. Otherwise, the used sub-blocks are transferred to the filtered-cache in step 287. Unused sub-blocks are evicted in step 289.

The function for computing K, as described above, is for simplicity of explanation. In general, any other memory access heuristics that can track spatial locality can be used to compute K.

The present invention provides a mechanism used to improve the hit ratio of the cache by dividing it into two parts, an unfiltered part and a filtered part. The mechanism is a preferred embodiment and does not indicate that alternative filtering schemes are less effective. Alternative filtering schemes are presented below and may be implemented in a similar fashion as those outlines above.

The filtered cache and unfiltered cache can have different replacement algorithms. Typically, LRU is the replacement algorithm of choice for cache management. However, the referencing pattern for a block has already been observed (established) while the line was in the unfiltered cache and it may be advantageous to use this information to aid the replacement policies used in the filtered cache.

For example, two common referencing patterns for a cache block include: (1) all references to the block occur while the line is in the most-recently-used (MRU) position of the replacement policy and then the line is unused and ages out of the cache. (2) The line is used over and over again from all positions of the LRU stack. These lines stay in the cache much longer by being reset to the MRU position of the replacement algorithm before they eventually age out of the cache.

When these sub-blocks are transferred to the filtered cache, this information can be conveyed to the replacement algorithm.

Sub-blocks that exhibit this referencing pattern may be identified by setting a bit (sticky-bit) to 1 in the directory of the filtered cache. This information can then be used to extend their lifetime while in the filtered cache. For example, if a line chosen for replacement has its sticky-bit set to 1, it can be sent to the MRU position of the replacement stack with the sticky-bit turned off (set to 0) and the next line in the LRU stack examined for replacement.

In this manner it is possible to extend the lifetime of sub-blocks in the filtered cache that exhibited a reuse pattern from different positions of the LRU stack while they were in the unfiltered cache.

In an alternate embodiment, the replacement policies as well as the number of sub-blocks saved in the filtered cache can be different for instruction fetched blocks and data fetched blocks. It is known that many applications have distinctively different referencing patterns for instructions and data. Loop unrolling can produce long sections of code without any branches that can extend over many cache lines. This can lead to vastly different sub-block referencing patterns for instructions and data with different average number of sub-blocks referenced per line. Separating these characteristics with different replacement policies and different adaptive-threshold filtering policies can produce improved performance over implementations with only a single policy.

Figure 9:
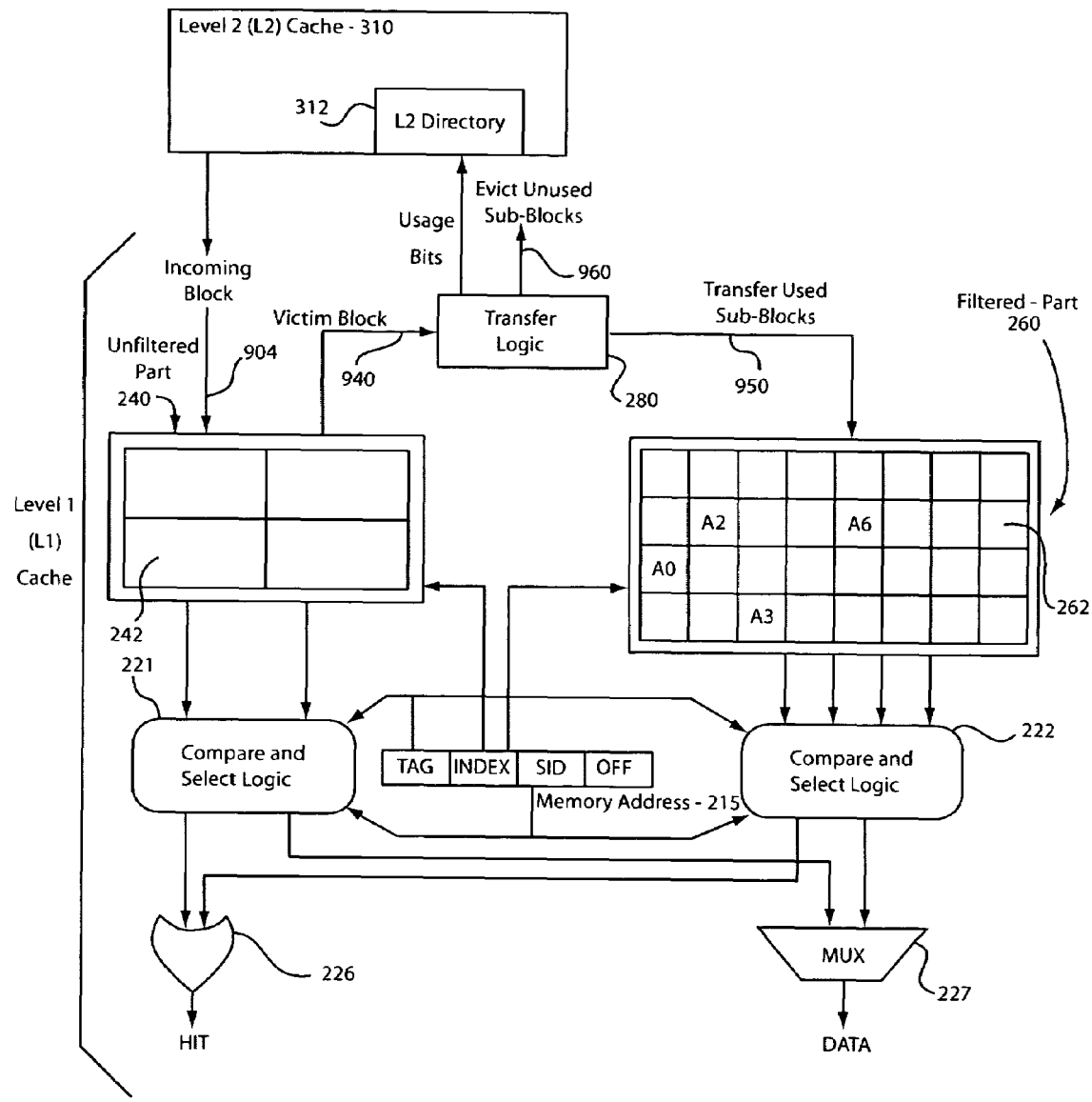
FIG. 9 illustratively shows a hierarchical cache system using usage bits to filter or reduce bandwidth based between cache levels in accordance with one embodiment of the present invention.

Referring to FIG. 9, caches may reside in a hierarchy of progressively larger, slower storage arrays. If the filtered/unfiltered aggregation of FIG. 4 is considered to include the level 1 cache (L1), then it is useful to consider the applicability of filter tags (usage tags) to assist in the interaction with the next level in the hierarchy—in this case, level 2 (L2) 310.

When a line or block ages out of the unfiltered portion 240 of the L1, a step of sending usage tags for the aged out line to the L2 cache directory may be employed (see e.g., FIG. 5). This enables the L2 cache to remember the usage pattern for the line or block. This information is useful in that it can be used to prefilter the line in the future.

In particular, once the line leaves the L1 (aggregation), if the line is rereferenced (resulting in a miss), then only those sectors that are known to be used (via the usage tags) are sent from the L2 to the L1. This eliminates unnecessary bandwidth. If these sectors are located in the unfiltered portion 240 of the L1 cache, then each sector needs a "Valid" bit or bits in addition to a "Usage" bit (e.g., some of the sectors will not be present). When first loaded, the "Valid" bits to be stored in the L1 directory would be a direct copy of the "Usage" bits that were stored in an L2 directory 312, i.e., these are the sub-blocks that were sent.

In addition, the usage tags in the L2, in addition to being used to filter or reduce the bandwidth, can be used to determine whether to locate the sub-blocks in the unfiltered 240 or the filtered portion 260 of the L1 aggregation. For example, if a line had only one sub-block that was used, we can choose to put it into the filtered side 260 of the L1 so as not to waste the unfiltered slots that could better be used to accommodate lines in which many sectors (sub-blocks) are used.

It could also be recalled which of the sectors (sub-blocks) is the Most Recently Used (MRU) in a line (block) in which multiple sectors (sub-blocks) are referenced (which requires a new "MRU" field to be stored with the usage tags). This can then be treated, on the filtered side 240 of the L1 aggregation, as a "victim" as follows. When a line ages out of the unfiltered side 240 of the L1 aggregation, we transfer (only) the MRU sector (sub-block) from the block into the filtered side 260 of the aggregation. If that sub-block is actually referenced in the future, then the reference is a hit, and we use this event to trigger a prefetch of the other referenced sectors from the L2 into the unfiltered portion 240 of the L1.

Note that additional bandwidth can be saved (e.g., on bus 904), since the MRU sector need not be brought in—this can be moved directly from the filtered side 260 of the aggregation to the unfiltered side 240.

It is to be understood that the features and aspects of the present invention may be combined in a plurality of ways. Different systems may employ all the aspects and features or a subset thereof. Although two levels of cache have been described in FIG. 9, a greater number of levels are also contemplated. Each level may be split into filtered and unfiltered portions as set forth above.

Having described preferred embodiments of an apparatus and method for filtering unused sub-blocks in cache memories (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A memory system, comprising:
   a physical cache comprising:
      a filtered portion and an unfiltered portion, both of which are simultaneously accessed during a service request,
      the unfiltered portion configured for storing block sized components, each block being comprised of a plurality of sub-blocks;
      the filtered portion configured for storing sub-block sized components such that blocks evicted from the unfiltered portion have selected sub-blocks from the evicted blocks thereof where only the used sub-blocks are cached in the filtered portion for servicing requests, such that, for any access, a block or sub-block can only reside in one of the unfiltered portion or the filtered portion; and
   a threshold used to compare to a number of used sub-blocks in a block such that if the number of used sub-blocks is less than the threshold then used sub-blocks are transferred to the filtered portion.

2. The system as recited in claim 1, wherein the selected sub-blocks include used sub-blocks.

3. The system as recited in claim 1, wherein the unfiltered portion and the filtered portion have different numbers of rows, and the system further comprises an index identifier to map blocks in the unfiltered portion and sub-blocks in the filtered portion.

4. The system as recited in claim 3, wherein the index is generated for both the unfiltered and filtered portions simultaneously.

5. The system as recited in claim 1, further comprising compare and select logic, which compares information about blocks or sub-blocks from a main memory with information about blocks or sub-blocks of the cache.

6. The system as recited in claim 5, wherein the compare and select logic provides a hit signal if a match exists between the information about blocks or sub-blocks from the main memory with the information about blocks or sub-blocks of the cache.

7. The system as recited in claim 1 further comprising transfer logic, which transfers sub-blocks to the filtered portion from the unfiltered portion.

8. The system as recited in claim 7, wherein the transfer logic examines sub-block usage bits in a directory to determine which sub-blocks were referenced while the sub-blocks resided in the unfiltered portion.

9. The system as recited in claim 8, wherein the transfer logic transfers used sub-blocks, of the block just replaced, to the filtered portion; otherwise if unused, the sub-block is discarded.

10. The system as recited in claim 1 wherein the threshold is dynamically adapted based upon used blocks and sub-blocks.

11. A memory system, comprising:
    a physical cache comprising:
       an unfiltered portion which stores information in blocks; and
       a filtered portion, which stores information in sub-blocks, the unfiltered and filtered portions being simultaneously accessed during a service request;
       transfer logic, which evicts blocks from the unfiltered portion in accordance with a policy such that the blocks evicted from the unfiltered portion have used sub-blocks, thereof cached in the filtered portion for servicing requests and unused sub-blocks of the blocks are evicted from the unfiltered portion, such that, for any access, a block or sub-block can only reside in one of the unfiltered portion or the filtered portion; and
    a threshold used to compare to a number of used sub-blocks in a block such that if the number of used sub-blocks is less than the threshold then used sub-blocks are transferred to the filtered portion.

12. The system as recited in claim 11, wherein the unfiltered portion and the filtered portion have different numbers of rows, and the system further comprises an index identifier to map blocks in the unfiltered portion with sub-blocks in the filtered portion.

13. The system as recited in claim 12, wherein the index is generated for both the unfiltered and filtered portions simultaneously.

14. The system as recited in claim 11, further comprising compare and select logic, which compares information about blocks or sub-blocks from a main memory with information about blocks or sub-blocks of the cache.

15. The system as recited in claim 14, wherein the compare and select logic provides a hit signal if a match exists between the information about blocks or sub-blocks from the main memory with the information about blocks or sub-blocks of the cache.

16. The system as recited in claim 11, wherein the transfer logic examines sub-block usage bits in a directory to determine which sub-blocks were referenced while the sub-blocks resided in the unfiltered portion.

17. The system as recited in claim 16, wherein the transfer logic transfers used sub-blocks, of the block just replaced, to the filtered portion; otherwise if unused, the sub-block is discarded.

18. The system as recited in claim 11, wherein the threshold is dynamically adapted based upon used blocks and sub-blocks.

19. A method for caching information, comprising the steps of:
    dividing a cache into a filtered portion and an unfiltered portion, the unfiltered portion storing block sized components, each block comprising a plurality of sub-blocks and the filtered portion storing sub-block sized components;
    simultaneously accessing both the filtered portion and the unfiltered portion during a service request;
    comparing a number of used sub-blocks in a block to a threshold such that if the number of used sub-blocks is less than the threshold then used sub-blocks are transferred to the filtered portion;
    evicting a block from the unfiltered portion in accordance with a policy such that blocks evicted from the unfiltered portion have selected used sub-blocks thereof cached in the filtered portion; and
    maintaining the selected used sub-blocks in the filtered portion in accordance with the policy such that, for any access, a block or sub-block can only reside in one of the unfiltered portion or the filtered portion.

20. The method as recited in claim 19, further comprising the step of indexing blocks in the unfiltered portion with sub-blocks in the filtered portion simultaneously when the unfiltered portion and the filtered portion have different numbers of rows.

21. The method as recited in claim 20, further comprising the step of comparing information about blocks or sub-blocks from a main memory with information about blocks or sub-blocks of the cache to determine a hit if a match exists between the information about blocks or sub-blocks from the main memory with the information about blocks or sub-blocks of the cache.

22. The method as recited in claim 19, further comprising the step of transferring sub-blocks to the filtered portion from the unfiltered portion employing transfer logic.

23. The method as recited in claim 22, wherein the step of transferring includes examining sub-block usage bits in a directory to determine which sub-blocks were referenced while the sub-blocks resided in the unfiltered portion.

24. The method as recited in claim 23, wherein the transfer logic transfers used sub-blocks, of the block just replaced, to the filtered portion; otherwise, if unused, the sub-block is discarded.

25. The method as recited in claim 19, wherein the threshold is dynamically adapted based upon used blocks and sub-blocks.

26. A program storage device readable by machine, tangibly embodying a program of instructions executable by the machine to perform method steps for caching information, the method steps comprising:

dividing a cache into a filtered portion and an unfiltered portion, the unfiltered portion storing block sized components, each block comprising a plurality of sub-blocks and the filtered portion storing sub-block sized components;

simultaneously accessing both the filtered portion and the unfiltered portion during a service request;

comparing a number of used sub-blocks in a block to a threshold such that if the number of used sub-blocks is less than the threshold then used sub-blocks are transferred to the filtered portion;

evicting a block from the unfiltered portion in accordance with a policy such that blocks evicted from the unfiltered portion have selected used sub-blocks thereof cached in the filtered portion; and maintaining the selected used sub-blocks in the filtered portion in accordance with the policy such that, for any access, a block or sub-block can only reside in one of the unfiltered portion or the filtered portion.

27. A hierarchical cache memory system, comprising:

a first level physical cache comprising:

a filtered portion and an unfiltered portion, both of which are simultaneously accessed during a service request, the unfiltered portion configured to store block sized components, each block being comprised of a plurality of sub-blocks, and including a usage bit to indicate that selected blocks evicted from the filtered portion have been previously used; and the filtered portion configured to store sub-block sized components such that blocks evicted from the unfiltered portion have selected sub-blocks thereof cached in the filtered portion for servicing requests such that, for any access, a block or sub-block can only reside in one of the unfiltered portion or the filtered portion; and a second level cache comprising a directory for storing a usage pattern based upon usage bits such that if a miss occurs in the level one cache, blocks indicated as used by the usage bits are provided to the level one cache wherein the sub-blocks provide valid bits to indicate usage in addition to the usage bits such that sub-blocks retrieved by the level two cache to the level one cache include appropriate usage and valid bits to reduce bus bandwidth.

28. The system as recited in claim 27, wherein the selected sub-blocks include used sub-blocks.

29. The system as recited in claim 27, wherein a most recently used (MRU) sub-block is stored with the usage bits and if the MRU sub-block is referenced from the unfiltered portion of the level one cache, a prefetch is triggered for other sub-blocks of the reference block from the level two cache into the unfiltered portion of die level one cache.

* * * * *